W. HESS, Jr.
SENDER FOR WATER STAGE RECORDERS.
APPLICATION FILED FEB. 18, 1918.
1,313,690.
Patented Aug. 19, 1919.
4 SHEETS—SHEET 1.
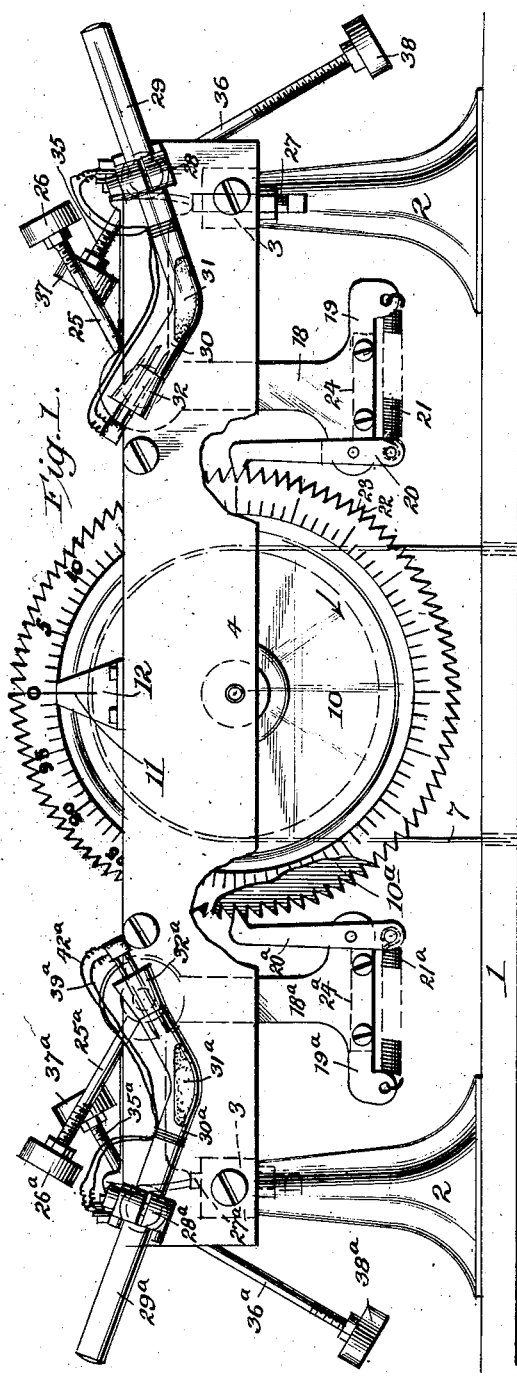
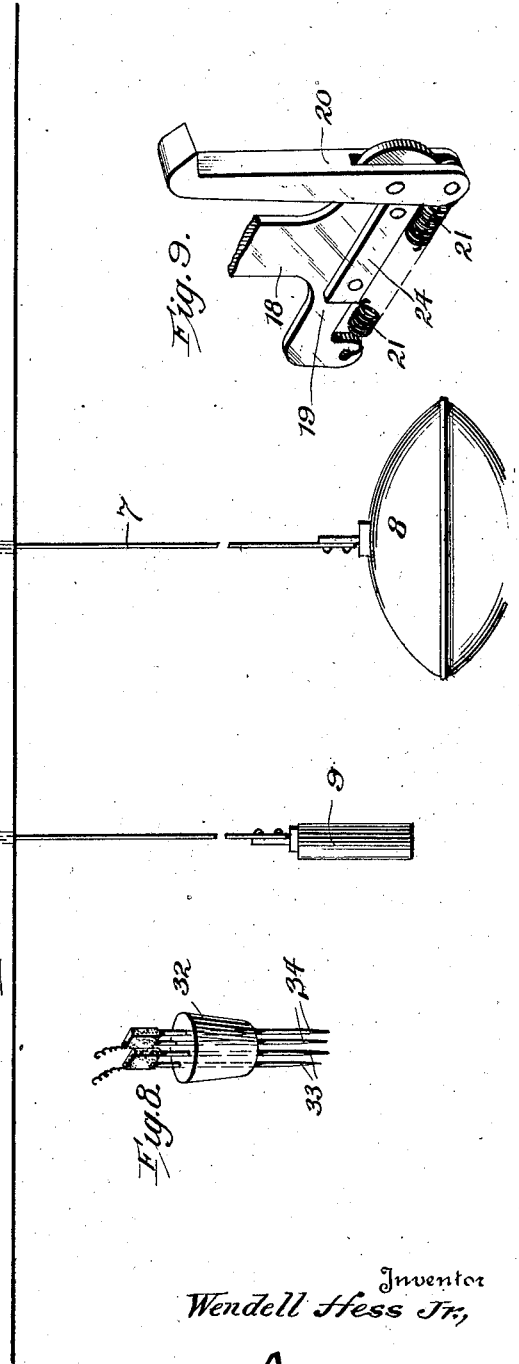
Inventor
Wendell Hess Jr.,
By Dodge and Sons,
Attorneys.

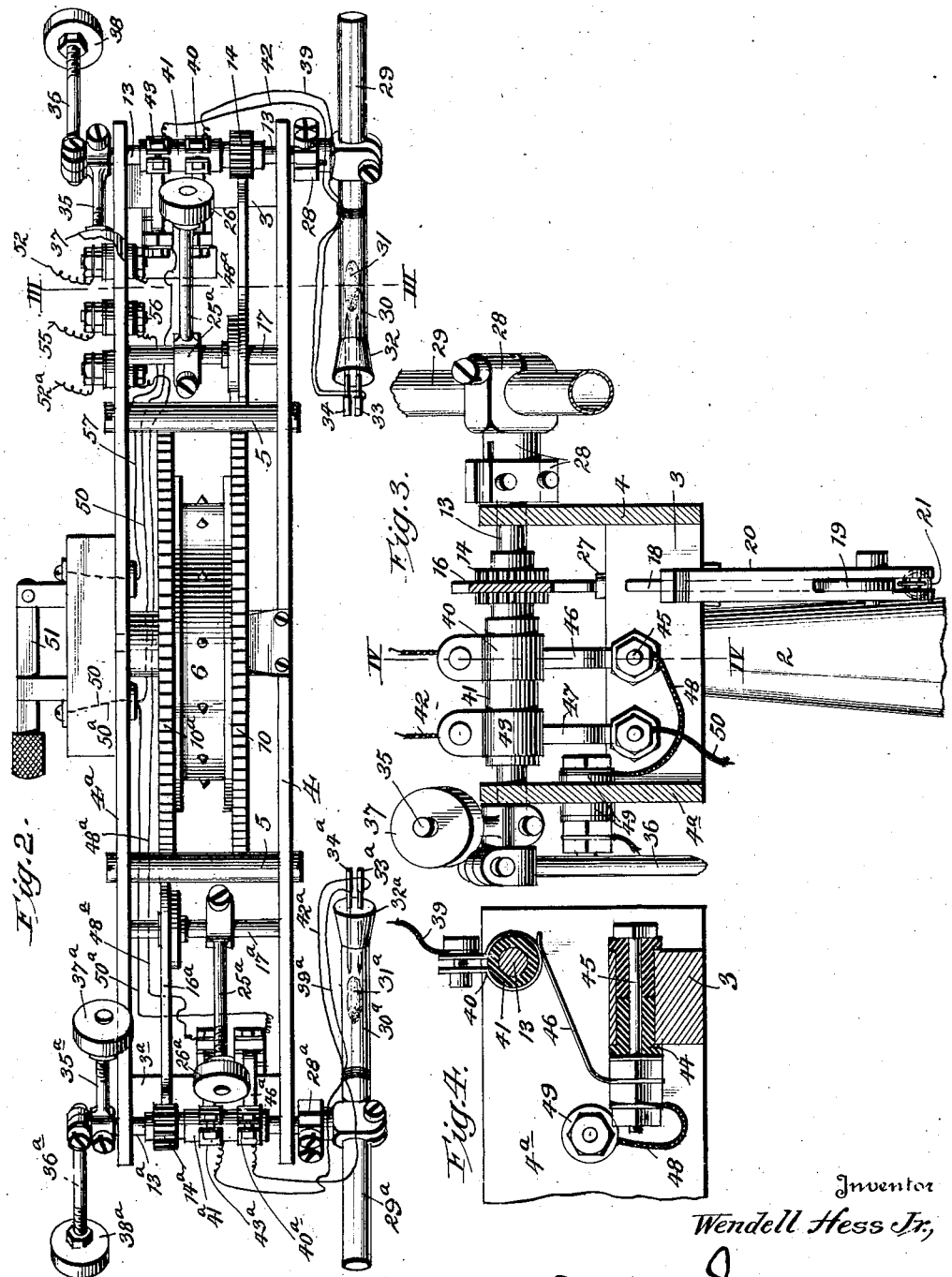

W. HESS, Jr.
SENDER FOR WATER STAGE RECORDERS.
APPLICATION FILED FEB. 18, 1918.
1,313,690.
Patented Aug. 19, 1919.
4 SHEETS—SHEET 3.
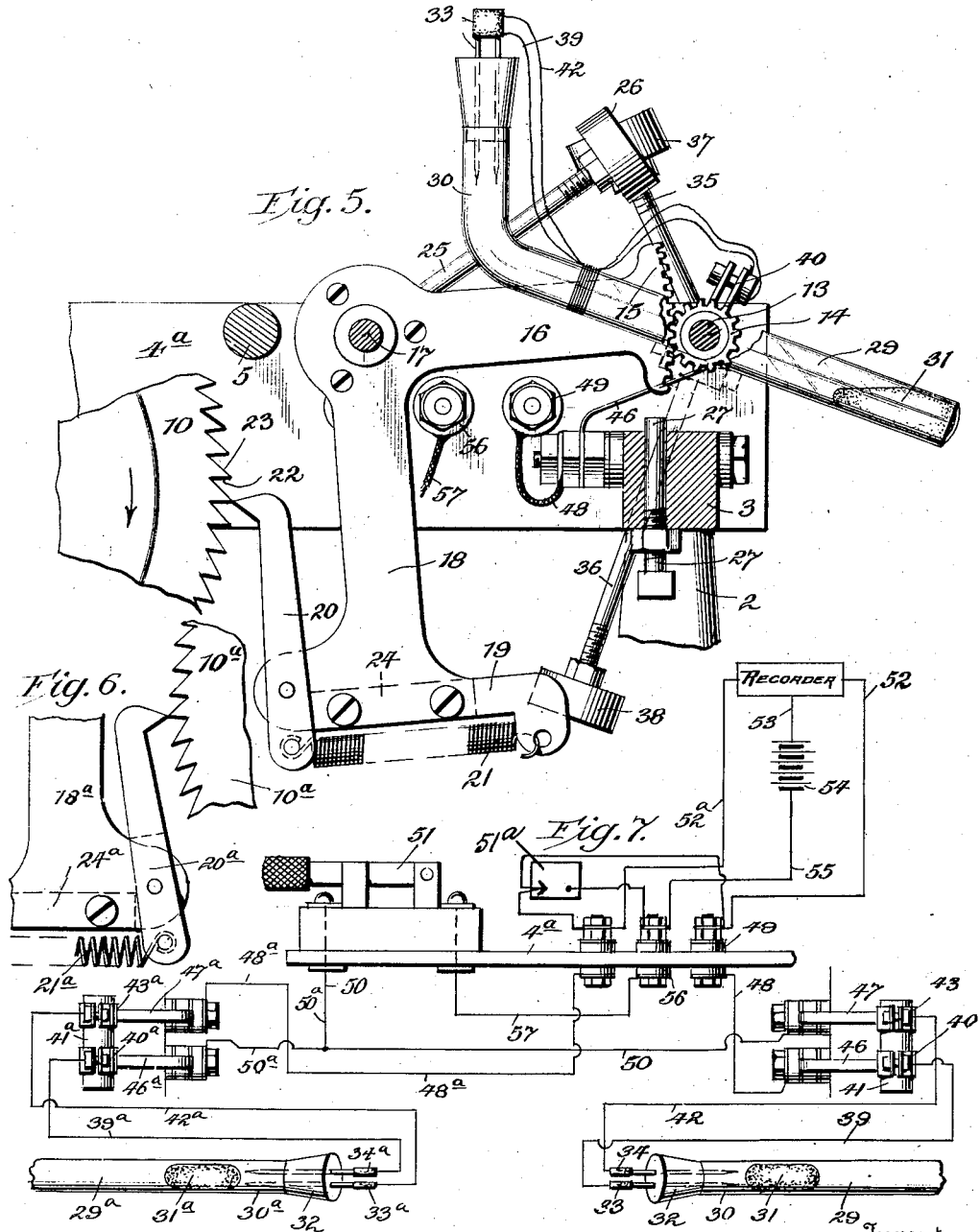
Inventor
Wendell Hess Jr.,
By Dodge and Sons,
Attorneys

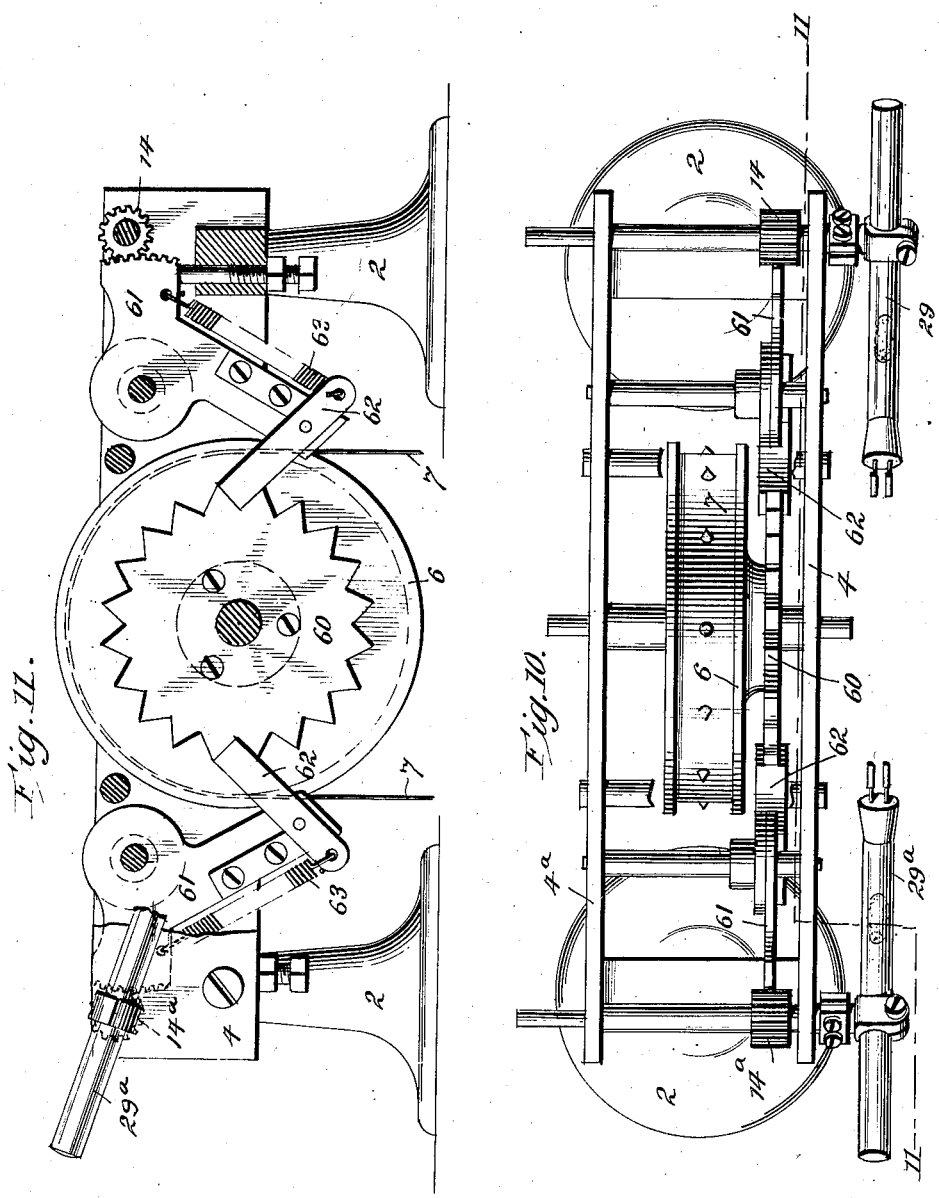

UNITED STATES PATENT OFFICE.

WENDELL HESS, JR., OF TROY, NEW YORK, ASSIGNOR TO W. & L. E. GURLEY, OF TROY, NEW YORK, A CORPORATION OF NEW YORK.

SENDER FOR WATER-STAGE RECORDERS.

1,313,690.   Specification of Letters Patent.   Patented Aug. 19, 1919.

Application filed February 18, 1918. Serial No. 217,914.

*To all whom it may concern:*

Be it known that I, WENDELL HESS, Jr., a citizen of the United States, residing at Troy, in the county of Rensselaer and State of New York, have invented a certain new and useful Improvement in Senders for Water-Stage Recorders, of which the following is a specification.

My present invention pertains to an improved mechanism for sending electric impulses over a line from a float gage to a water-stage recorder.

In the modern practice of recording the water stage of a given body of water it is often desirable to have the recorder located at a distance from the body of water being gaged and to that end the float gage is located at the point where the measurement is to be made, while the recorder is located distant therefrom, in some instances many miles.

Inasmuch as the sender is left unattended for weeks and months at a time, it is essential that the structure be such that it will operate without fail and likewise be accurate in its operation. The present structure fulfils these requirements in addition to being extremely sensitive and responsive to the slightest rise and fall in the water level.

The mechanism is illustrated in the annexed drawings, wherein:

Figure 1 is a front elevation, partly broken away, both operating pawls being shown in full engagement with the respective coacting ratchet-like impelling wheels;

Fig. 2 a top plan view, the parts being in the same positions as in Fig. 1;

Fig. 3 a transverse vertical sectional view on the line III—III of Fig. 2, and on an enlarged scale;

Fig. 4 a detail sectional view, on the line IV—IV of Fig. 3, illustrating more particularly one of the contact brushes and its mounting;

Fig. 5 a detail elevation of one of the actuating arms and the mercury-containing circuit-closing tubes operated thereby, the parts being in that position which they assume just at the instant prior to the release of the pawl and the consequent downward swinging movement of the tube to close the circuit;

Fig. 6 a detail view of the opposite arm, pawl and actuating or impelling wheel illustrating the position which such elements assume when the corresponding elements at the other end of the apparatus are in the positions shown in Fig. 5;

Fig. 7 a diagrammatic view illustrating the electric circuits;

Fig. 8 a perspective view of one of the tube closures and the terminals carried thereby;

Fig. 9 a similar view of one of the pawls and a portion of the lever upon which it is mounted;

Fig. 10 a top plan view of a modified form of the apparatus; and

Fig. 11 a longitudinal sectional view taken on the line XI—XI of Fig. 10.

In Figs. 1 to 9, 1 denotes a base from which arise two standards or columns 2, 2 each column being provided with a cross bar 3. Secured to and supported by said bars are two flat vertically-disposed plates or frame elements 4, 4ª, said plates being rigid and held in their parallel spaced relation by two interposed spacer elements 5, 5, Fig. 2. Said plates or frame elements 4 and 4ª form the supporting members of the various operative elements of the apparatus. 6 denotes a toothed drum, said drum being mounted to rotate upon a bearing, as a shaft, secured between and supported by the plates 4 and 4ª. A perforated band 7, Fig. 1, passes about said drum, the teeth whereof pass into the perforations of the band, the band having a float 8 attached to one end and a counterweight 9 to its opposite end. The band passes through suitable openings in the base 1, the float resting upon the surface of the water and rising and falling therewith. By reason of the presence of the counterweight 9 the rise and fall of the float will be imparted to the band, and consequently to the drum, in one or the other direction, as the case may be, the slightest movement of the float being imparted to the drum.

Secured to and rotatable with the drum are two toothed wheels 10 and 10ª, the former coacting with the circuit-closing mechanism on the right of the apparatus, and the latter with similar mechanism to the left. Wheel 10 is preferably graduated on one face, as from 0 to 100 and an index mark 11 formed upon an upstanding arm 12 secured to plate 4 enables the attendant to properly set the apparatus and to determine at any time the then water level. The circuit-closing mechanism at the right is brought into action upon the fall of the water level and the consequent lowering of the float while the mechanism at the left comes into action when the water level rises.

Inasmuch as the parts of both mechanisms are alike throughout a description of one will suffice for a clear understanding of construction and operation, the duplicated parts being similarly numbered and given the exponent "a".

Journaled in the side bars 4 and 4ª above the cross-bar 3 is a shaft 13 said shaft extending outwardly beyond said bars. The shaft has secured thereto a pinion 14 which is in mesh with a segmental rack 15, see Fig. 5, formed upon the outer end of the upper element 16 of an elbow-lever, which lever is secured to and rotatable with a shaft 17 journaled in the side bars 4 and 4ª.

The lower end of the downwardly-extending arm 18 of the elbow-lever is enlarged or fashioned into a cross arm 19, said arm having pivotally mounted on its inner end a pawl 20. A spring 21 connected to the lower end of the pawl and to the opposite end of cross-arm 19 tends to throw the upper toothed end of the pawl toward and into contact with the toothed actuating wheel 10 (or in case of the mechanism at the left with the toothed wheel 10ª). The tooth of the pawl will preferably be shaped as best shown in Fig. 5, that is, its upper face will lie in a plane approximating the horizontal with its under face inclining downwardly from its point. The teeth upon the wheel are of reverse form, that is to say, the under actuating surface 22 is more nearly radially disposed than the upper face 23. Secured to or formed as a part of the arm 19 is a stop block 24, Fig. 9, located in a plane below the pivot of the pawl and serving to prevent the pawl from swinging outwardly away from the arm, while permitting it to swing inwardly, see Fig. 6, thus causing the pawl to swing the elbow-lever when the actuating wheel is moving in such direction as to cause pressure to be exerted on the pawl by the face 22, while permitting it to swing and ride freely out of the teeth when the actuating wheel is moving in the opposite direction. In Fig. 5 the wheel has moved in the direction of the arrow the distance of nearly one tooth and the lever through force applied through the pawl has been rocked; a continued movement in the same direction will allow the pawl to enter the next succeeding tooth and the lever will swing back quickly to its normal position, shown in Fig. 1. At the same time, pawl 20ª will ride in and out of the teeth on wheel 10ª, Fig. 6, the teeth of the two wheels being reversely formed.

Secured to shaft 17 and extending upwardly and outwardly therefrom is an arm 25, provided with an adjustable counterweight 26, the weight acting through the arm and shaft to throw the lower element 18 of the elbow-lever inwardly and to hold the pawl in engagement with the teeth of the actuating wheel at all times. To limit said movement and to provide for accurate adjustment of the parts an adjustable stop rod 27 is mounted in the cross bar 3, the upper end of the rod underlying the lower end of the rack member 15.

Adjustably secured to one of the protruding ends of shaft 13 is a clamp 28, Figs. 2 and 3, the head whereof is formed with a transversely extending socket in which is seated and secured a glass tube. Said tube has a straight body portion 29, and an upturned end 30, the straight portion at substantially its midlength being clamped in the socket and inclining downwardly to a slight extent toward its inner upturned end when the parts are in a position of rest, as shown in Fig. 1. The tube at its outer end is closed and a body of mercury denoted by 31 is placed therein, said body so long as the parts are at rest, pooling in the elbow or bend of the tube, see Fig. 1. The inner end of the tube through which the mercury is introduced is closed by a plug or stopper 32 through which extend terminals 33, 34, said terminals being arranged in pairs and taking the form of needles which pass through and extend beyond the inner end of the plug. Shaft 13 at the end opposite clamp 28 is provided with two arms 35 and 36, said arms carrying, respectively, adjustable counterweights 37 and 38, arm 35 being short and extending upwardly and inwardly of the shaft, while arm 36 is relatively long and extends below and outwardly from the shaft; in other words, the counterweights are opposed. The members of each pair of terminals 33, 34 are connected at their outer ends to each other, and a wire 39 extends from terminals 33 to a metallic collar 40 secured upon an insulating bushing 41, rigid with shaft 13, while a wire 42 extends from terminals 34 to a similar collar 43.

Cross bar 3, see Fig. 4, is bored through and insulating bushings 44 are mounted therein, a bolt 45 extending through said bushings supporting a brush 46, the upper free end thereof bearing against the metal collar 40 and making a rubbing contact therewith. A second brush 47, similarly supported makes contact with collar 43. A wire 48 extends from brush 46 to a binding-post 49 supported upon plate 4ª, and a wire 50 connects brush 47 with one terminal of a switch 51. A line 52 extends from post 49 to the recorder and the circuit is completed therefrom through line 53, battery 54, line 55, binding-post 56 and line 57 to the switch 51.

As above described, the corresponding elements and circuits for the circuit-closing mechanism are designated by similar numbers to which is added the exponent "a".

A condenser may be included, as indicated in Fig. 7. This condenser will act to store the current for an instant and prevent a large spark in the tubes.

The recorder may, as above noted, be located at any desired point remote from the sender above described, and any suitable circuit wiring may be employed.

The operation of the apparatus is as follows: Assuming the parts are in the positions shown in Fig. 1 and the float descends owing to a fall in the water-level, the actuating or ratchet wheels 10 and 10ᵃ will be moved in the direction indicated by the arrow in Figs. 1, 5 and 6. Such movement will, by reason of the formation of the teeth and of the pawl, carry pawl 20 downwardly therewith and rock the elbow-lever, pawl 20ᵃ at such time swinging on its pivot and allowing its allied circuit-closer or tube to remain at rest. Such downward movement of the pawl 20 and swinging of the lever will continue until the tooth of the wheel passes clear of the pawl, but in the meantime rack 15 will have rotated shaft 13 and rocked or carried the mercury-containing, circuit-closing tube into the position shown in Fig. 5, wherein it will be noted that the mercury has run back to the outer, then depressed, end of the tube. In Fig. 5 the pawl is shown as just clearing the tooth and the slightest advance of the wheel 10 frees the pawl and allows it to ride into the next succeeding space between the teeth. The elbow-lever (16-18) also swings back to the position shown in Fig. 1 under the action of the counterweights 37, 38, and the body of mercury will surge forward in the tube and by reason of its momentum pass up into the upwardly inclined portion 30 (or 30ᵃ as the case may be) and momentarily bridge the needle terminals 33, 34, thereby closing the circuit and permitting an impulse to be sent over the line to the recorder.

In case the float should rise after the parts come to the positions shown in Fig. 5, the parts would move back to the positions indicated in Fig. 1, though the pawl might not fully enter the space between the teeth if the float did not rise sufficiently, in which event the mercury would not reach the needle terminals and the circuit would not become established. It is only when the pawl is released in the manner above indicated that the tube has a free fall or rocking motion sufficient to cause the body of mercury to surge upwardly into contact with the terminals. When the float rises the mechanism on the left operates in the same manner as indicated in connection with that on the right, the circuit actuating the recorder to show a rise instead of a fall in the water level or stage.

The drum or sprocket wheel 6 is just one one foot in circumference and the wheels 10 and 10ᵃ are each shown as having one hundred teeth, and the instrument is, therefore, designed to record hundredths of a foot. Where, however, such fine adjustments are not required, a construction such as shown in Figs. 10 and 11 may be employed. Under this form or embodiment of the invention a single toothed wheel is alone employed, said wheel being designated by 60. It is directly connected to and rotates with the drum 6, which, as in the other form, is actuated by the float and counterweight connected to the band 7 which passes over the drum. The elbow-levers in this instance are designated by 61, and correspond in operation and function to the levers 18 in the construction first described. The pawls 62, fulcrumed upon the levers are normally held in contact with the teeth of the wheel by the springs 63, said teeth being at the same angle on each side of the center line, and not formed as above described. The other parts are substantially the same as those employed in the form first set forth, and certain parts are, therefore, omitted from the two views 10 and 11. By having the teeth formed as just noted, I am enabled to use a single wheel, which, of course, reduces expense and is, furthermore, of advantage.

The tubes containing the mercury or other suitable circuit-closing fluid (such, for instance, as water with a small amount of acid therein) are of the same form, and operate in the same manner as above set forth, to close the circuit on one or the other side of the recorder as the case may be. I prefer, however, to employ mercury as the circuit-closing medium, owing to its high specific gravity, and also because it is a good electric conductor, and where the term "mercury" is employed in the claims it is to be understood as including any material which will properly function and produce the results desired.

While I have shown two needles as forming a single terminal, one needle might be employed, though two are preferred as a factor of safety. By using needles failure to close the circuit is minimized, as the needles penetrate the body of mercury and insure perfect contact. Iron, steel or other metal which will not unite with the mercury may be employed as the substance for forming the needles. The principal object to be accomplished in the mercury-containing, circuit-closing tubes is to provide a large factor of safety in the movement of the mercury. In other words, the tubes and mercury under both constructions above set forth are so arranged that a small variation from the normal movements of the mercury will not make a contact that is not governed precisely by the rise or fall of the water. The length of the tube to each side of the elbow or bent portion, the sharpness of the elbow, and the amount of mercury resting in the elbow are essential, the amount of mercury being such that when the tubes are at rest the elbow or bend will be full of mercury, as best indicated in Fig. 1. This prevents the mercury from oscillating. If too much mercury is placed in the tube, it will not function properly. In other words, if the amount of mercury is such that it will entirely fill the inside diameter of the tube while it is running through the tube, it will not properly function.

The constant rubbing of the brushes on the collars keeps these parts bright and prevents failure of the passage of the current therethrough.

Having thus described my invention, what I claim is:

1. In a device of the character specified, the combination of an actuating element; means responsive to the medium to be gaged for moving the same; a closed tube; a rocking support therefor; a body of mercury in the tube; circuit terminals extending into said tube and normally out of contact with the mercury; and means interposed between said tube and actuating element for moving the tube in one direction and allowing a free movement thereof in the opposite direction when the actuating element has moved a predetermined distance, whereby the mercury will surge forward and momentarily bridge the terminals and immediately recede.

2. In a device of the character specified, the combination of two toothed actuating wheels; float-controlled means serving to oscillate said wheels; a circuit-closer associated with each wheel; and a pawl-actuated mechanism interposed between each wheel and its circuit-closer and actuated directly by the toothed wheel for operating the latter circuit closer when the wheel moves a predetermined distance.

3. In a device of the character specified, the combination of two toothed actuating wheels, the teeth whereof are inclined in opposite directions; float-controlled means serving to oscillate said wheels; and a circuit-closing mechanism associated with each wheel, said mechanism comprising a pivotally mounted elbow-lever, a pawl pivotally carried by one arm of the lever and coöperating with the teeth of the adjacent actuating wheel, a shaft, a pinion secured thereto, a rack carried by the lever and meshing with the pinion, a closed bent tube secured to the shaft and movable therewith, a body of mercury normally resting in the bent portion of the tube, and circuit terminals extending into the normally upstanding end of the tube.

4. In a device of the character specified, the combination of two-toothed actuating wheels, the teeth whereof are inclined in opposite directions; float-controlled means serving to oscillate said wheels; a pair of shafts; a pawl coöperating with each wheel; means interposed between each pawl and one of the shafts for partially rotating the same as the pawl is positively actuated by movement of its coöperating wheel; and a circuit-closer carried by each shaft, said closer coming into action only when the shaft has been moved to a predetermined position.

5. In a device of the character specified, the combination of two toothed actuating wheels, the teeth whereof each have a substantially radially disposed face and an inclined face, the teeth of one wheel being arranged in a reverse direction to those of the other; float-controlled means for oscillating said wheels; and a circuit-closing mechanism operated by each wheel, said mechanism comprising an elbow-lever, a pawl pivotally mounted on the lower arm of such lever, the nose of the pawl conforming to the shape of the teeth on the wheels, a spring serving to throw the pawl into operative relation with the teeth, a stop holding said pawl against swinging movement when pressure is applied thereon by the actuating wheel, a shaft, a rack and pinion connection between said shaft and the upper end of the elbow-lever, a closed tube secured to said shaft, said tube having two arms or portions standing at an angle to each other with the ends pointing upwardly, a body of mercury located in the tube, and circuit terminals extending into one end of the tube.

6. In a device of the character specified, the combination of two toothed actuating wheels, the teeth whereof each have a substantially radially disposed face and an inclined face, the teeth of one wheel being arranged in a reverse direction to those of the other; float-controlled means for oscillating said wheels; and a circuit-closing mechanism operated by each wheel, said mechanism comprising an elbow-lever, a pawl pivotally mounted on the lower arm of such lever, the nose of the pawl conforming to the shape of the teeth on the wheels, a spring serving to throw the pawl into operative relation with the teeth, a stop holding said pawl against swinging movement when pressure is applied thereon by the actuating wheel, a shaft, a rack and pinion connection between said shaft and the upper end of the elbow-lever, a closed tube secured to said shaft, said tube having two arms or portions standing at an angle to each other with the ends pointing upwardly, a body of mercury located in the tube, circuit terminals extending into one end of the tube, a pair of brushes, contact collars mounted on the shaft aforesaid and against which the brushes respectively bear, and lead wires extending from the terminals to said collars.

7. A circuit-closer, comprising a closed tube having two angularly disposed arms or portions with the ends thereof pointing upwardly; a body of mercury normally resting in the bend of the tube; circuit-terminals projecting into the tube adjacent one end thereof and normally out of contact with the mercury; and means for tilting and then releasing the tube to cause the mercury to first run out of the bend and into that arm which is free of the terminals, and then, when the tube is released, to surge forward therethrough and upwardly in the other arm into contact with the terminals.

8. A circuit-closer comprising a closed tube having two angularly disposed arms with the ends thereof pointing upwardly; a shaft; means for securing the tube to the shaft; a body of mercury normally resting in the bend of the tube; circuit terminals extending into one end of the tube; means for rocking the shaft in one direction and thereby causing the mercury to run rearwardly in the tube and remote from the terminals, said means freeing itself when the shaft has been moved to a predetermined extent; and a counterweight acting to move the shaft in the opposite direction when the rocking means is released, thereby causing the mercury to surge forward and into contact with the terminals.

In testimony whereof I have signed my name to this specification.

WENDELL HESS, JR.